(12) United States Patent
Strasser et al.

(10) Patent No.: US 9,344,408 B2
(45) Date of Patent: May 17, 2016

(54) CLOUD-BASD DIGITAL VERIFICATION SYSTEM AND METHOD

(71) Applicant: Onespin Solutions GmbH, Munich (DE)

(72) Inventors: Dominik Strasser, Olching (DE); Gerrit Niesler, Wremen (DE); Mirko Fit, Loxstedt (DE); Raik Brinkmann, Inning a. Ammersee (DE)

(73) Assignee: Onespin Solutions GmbH, Munich (DE)

( * ) Notice: Subject to any disclaimer, the term of this patent is extended or adjusted under 35 U.S.C. 154(b) by 0 days.

(21) Appl. No.: 14/261,671

(22) Filed: Apr. 25, 2014

(65) Prior Publication Data

US 2014/0325669 A1 Oct. 30, 2014

Related U.S. Application Data

(63) Continuation-in-part of application No. 13/870,263, filed on Apr. 25, 2013, now abandoned.

(51) Int. Cl.
*G06F 17/50* (2006.01)
*H04L 29/06* (2006.01)
*G06F 21/60* (2013.01)

(52) U.S. Cl.
CPC .......... *H04L 63/0428* (2013.01); *G06F 17/504* (2013.01); *G06F 21/606* (2013.01); *G06F 17/5045* (2013.01); *G06F 2217/04* (2013.01)

(58) Field of Classification Search
USPC ........................................................ 716/116
See application file for complete search history.

(56) References Cited

U.S. PATENT DOCUMENTS

| | | | |
|---|---|---|---|
| 6,094,485 A | 7/2000 | Weinstein | |
| 6,363,478 B1 | 3/2002 | Lambert | |
| 2004/0199491 A1* | 10/2004 | Bhatt | 707/2 |
| 2006/0200789 A1* | 9/2006 | Rittman | 716/19 |
| 2008/0127028 A1* | 5/2008 | Rittman | 716/19 |
| 2009/0138337 A1 | 5/2009 | Moukas | |
| 2011/0119645 A1* | 5/2011 | Koizumi | 716/102 |
| 2012/0030468 A1* | 2/2012 | Papamanthou et al. | 713/171 |

OTHER PUBLICATIONS

Monteiro, et al., "A service-oriented architecture for integrating the modelling and formal verification of genetic regulatory networks," BMC Bioinformatics, vol. 10, No. 1, Jan. 1, 2009, p. 450.

* cited by examiner

*Primary Examiner* — Mohammed Alam
(74) *Attorney, Agent, or Firm* — 24IP Law Group; Timothy R DeWitt (57) ABSTRACT

A method for formal verification of a digital circuit using a cloud-based verification engine. The method comprises extracting a proof problem from a design of a digital circuit with a local processor, reducing said proof problem to proof relevant data, encrypting said reduced proof problem, transmitting said encrypted reduced proof problem to a remote server, decrypting said encrypted reduced proof problem at said remote server, storing said reduced proof problem in a memory at said remote server, running a proof on said reduced proof problem at said remote server to generate a proof result; encrypting said proof result at said remote server; transmitting said encrypted proof result to said local processor; decrypting said encrypted proof result at said local processor; and reconstructing a verification result of said digital circuit design at said local processor using said decrypted proof result.

8 Claims, 8 Drawing Sheets

CLOUD-BASD DIGITAL VERIFICATION SYSTEM AND METHOD

CROSS-REFERENCE TO RELATED APPLICATIONS

The present application is a continuation in part of U.S. patent application Ser. No. 13/870,263 filed by the present inventors on Apr. 25, 2013.

STATEMENT REGARDING FEDERALLY SPONSORED RESEARCH OR DEVELOPMENT

None.

BACKGROUND OF THE INVENTION

1. Field of the Invention

The present invention relates to systems and methods for verification of digital circuits.

2. Brief Description of the Related Art

The design of an integrated circuit may be broken down into several steps. In a first step, an overall architecture and behavior of an integrated circuit may be designed. Then, a specification of the design's high-level functionality is typically expressed at the register-transfer level (RTL) using a hardware description language (HDL). RTL description (also known as "register transfer logic") is a description of an integrated circuit in terms of data flow between registers, which store information between clock cycles in the integrated circuit. The RTL description specifies what and where this information is stored and how it is passed through the integrated circuit during its operation.

After describing the design's high-level functionality, the functional design of the integrated circuit is implemented into gate level logic. Such implementation may be performed using, for example, logic synthesis electronic design automation (EDA) software. Then, the logical design of the integrated circuit is implemented into physical components representing transistors and their interconnecting wires. Such physical implementation may be performed, for example, using routing and placement EDA software. After the physical design of the integrated circuit is completed, the design is released for subsequent manufacture and production of the integrated circuit.

After each of the steps described above, verification is typically performed to ensure that the step was performed correctly. Generally, such verification involves testing the integrated circuit design over various combinations of input, internal, and process constraints.

Digital circuits such as processors or application specific integrated circuits (ASICS) have become increasingly complex over the last decades. Engineers developing, designing and testing digital circuits have to ensure that a digital circuit has the required functionality and that bugs or malfunctions are excluded as far as possible. The design of a digital circuit should thus be verified before the actual production starts to avoid costs for erroneous circuits having undetected bugs. Simulation of a digital circuit design was therefore frequently applied in order to simulate the function of a digital circuit design. Computing a simulation, however, can be time consuming and expensive with modern complex designs.

Formal verification of digital circuits has become an alternative or complementary tool to simulation of digital circuits. Verification of a digital circuit is usually performed during the design of a digital circuit to verify that the planned design provides the desired functionality without relevant bugs. Formal verification uses formal assertions or formal properties which describe aspects of behaviour of the digital circuit design. A set of the formal assertions or formal properties is used to describe the behaviour of functions of the digital circuit. The digital circuit is then verified by verifying that each one of the properties holds for the description of the digital circuit design. In many cases a design of a digital circuit is described at the register transfer level (RTL) using languages such as VHDL, Verilog, SystemVerilog, C, C++, System C or others.

It is important to know whether a design of a digital circuit has been completely verified or has been verified to an extent that verification can be considered sufficiently complete and safe. State of the art literature determines the coverage of a verification process by determining whether enough assertions or properties have been established to cover the entire behaviour of the design of the digital circuit. A summary of known methods is given in the article "Coverage Metrics for Formal Verification" by H. Chockler et al. Proceedings of CHARME, 2003. Additional methods have been disclosed, for example, in U.S. Patent Application Publication No. 2007/0226663, U.S. Pat. No. 6,484,134 and U.S. Pat. No. 8,359,561.

The patent application US 2006/0200789 A1 discloses a method for checking the connectivity of an integrated circuit mask layout against an electrical connection in a netlist. Such checks have been termed LVS (Layout versus Schematics) checks. The method is performed across the Internet based on a web browser using a secured connection.

The U.S. Pat. No. 6,363,478 B1 relates to a session processing module for a server adapted to communicate across the Internet with clients. The module identifies the client and established a connection upon identification, using compression and decryption parameters to be determined.

The U.S. Pat. No. 6,094,485 teaches a method for establishing an encrypted connection between a client and a server upon determining an available encryption strength for the connection.

With the advent of cloud computing, systems and methods have been proposed for running circuit verification in the cloud. With such systems, circuit design data, i.e. data pertaining to a design of a digital circuit, would be uploaded into the cloud to permit verification of the circuits. Such systems and methods suffer from security issues associated with transferring and storing circuit design data in the cloud.

SUMMARY OF THE INVENTION

In a preferred embodiment, the present invention is a method for formal verification of a digital circuit. The method comprises extracting a proof problem from a design of a digital circuit with a local processor by removing timing aspects from the design of the digital circuit, reducing said proof problem to proof relevant data by removing all signals that are not inputs or states of the digital circuit, anonymizing with a translation table and encrypting said reduced proof problem, transmitting said anonymized and encrypted reduced proof problem to a remote server, decrypting said anonymized and encrypted reduced proof problem at said remote server, storing said anonymized reduced proof problem in a memory at said remote server, running a proof for verification of the design of the digital circuit on said anonymized reduced proof problem at said remote server to generate an anonymized proof result; encrypting said anonymized proof result at said remote server; transmitting said anonymized and encrypted proof result to said local processor; de-anonymizing and decrypting said encrypted proof result at said local processor; and reconstructing a verification result of said digital circuit design at said local processor using the inputs and states from said de-anonymized and decrypted proof result.

The extracted proof problem may comprise a reformulation of an HDL representation of the design of the digital circuit.

The encrypted reduced proof problem may be compressed prior to the transmitting thereof to said remote server.

The encrypted reduced proof result may be compressed prior to the transmitting thereof to said local processor.

Still other aspects, features, and advantages of the present invention are readily apparent from the following detailed description, simply by illustrating a preferable embodiments and implementations. The present invention is also capable of other and different embodiments and its several details can be modified in various obvious respects, all without departing from the spirit and scope of the present invention. Accordingly, the drawings and descriptions are to be regarded as illustrative in nature, and not as restrictive. Additional objects and advantages of the invention will be set forth in part in the description which follows and in part will be obvious from the description, or may be learned by practice of the invention.

BRIEF DESCRIPTION OF THE DRAWINGS

For a more complete understanding of the present invention and the advantages thereof, reference is now made to the following description and the accompanying drawings, in which.

DETAILED DESCRIPTION OF THE PREFERRED EMBODIMENTS

The present invention may be better understood when reading the following description of examples of the implementation of the present invention. A person skilled in the art should understand that the features described in relation to one example can be combined with other examples and that not all features need to be implemented for implementing the present invention.

Figure 1:
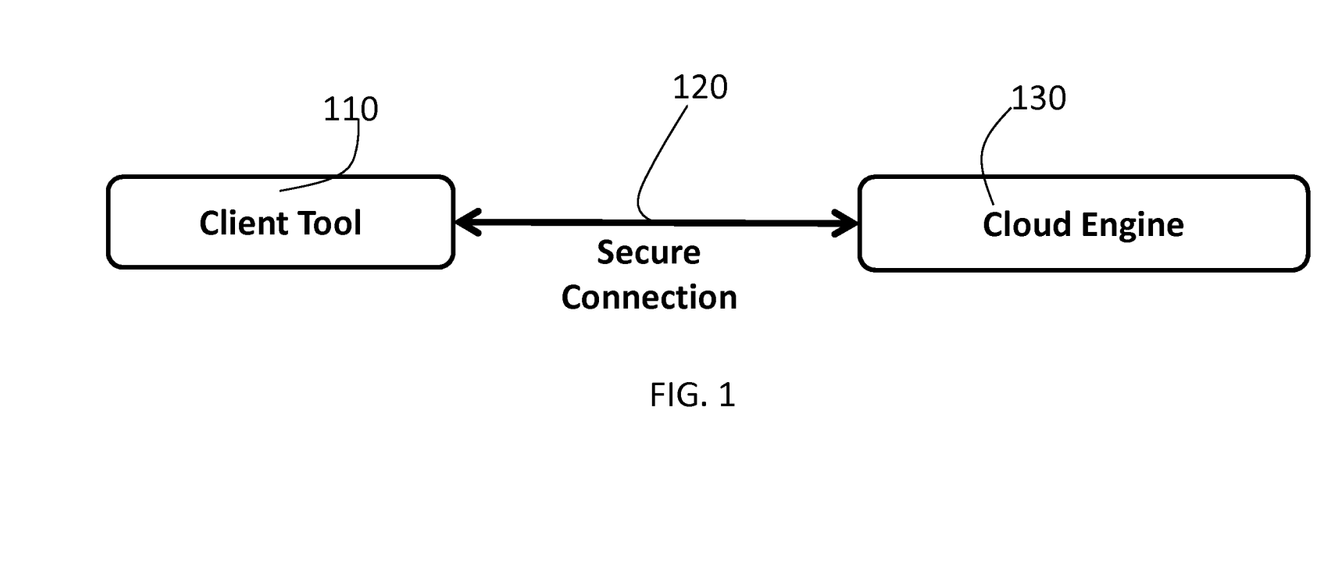
FIG. 1 is a block diagram of a system in accordance with a preferred embodiment of the present invention.

The present invention uses cloud-based computing to achieve fast, scalable, flexible, effective and affordable verification of digital circuits in a secure manner. In the system and method of the present invention, no re-engineerable circuit design data, i.e. data pertaining to a design of a digital circuit, is transmitted outside the local network. As shown in FIG. 1, a system in accordance with a preferred embodiment of the present invention has a local client tool 110 that communicates via a secure connection 120 with a cloud-based engine 130, for example, on a remote server. The client tool 110 may run, for example, on a desktop. The client tool 110 manages circuit design data, i.e. the source code representation of the integrated circuit's RTL functionality by an HDL. From the circuit design data, the client tool 110 creates proof tasks, also termed proof problems, for the verification of the design of the digital circuit. In subsequent steps, the client tool 110 may also be used for debugging the digital circuit designed. The cloud-based engine 130 performs proof tasks without storing any re-engineerable circuit design data at the remote location.

Figure 2:
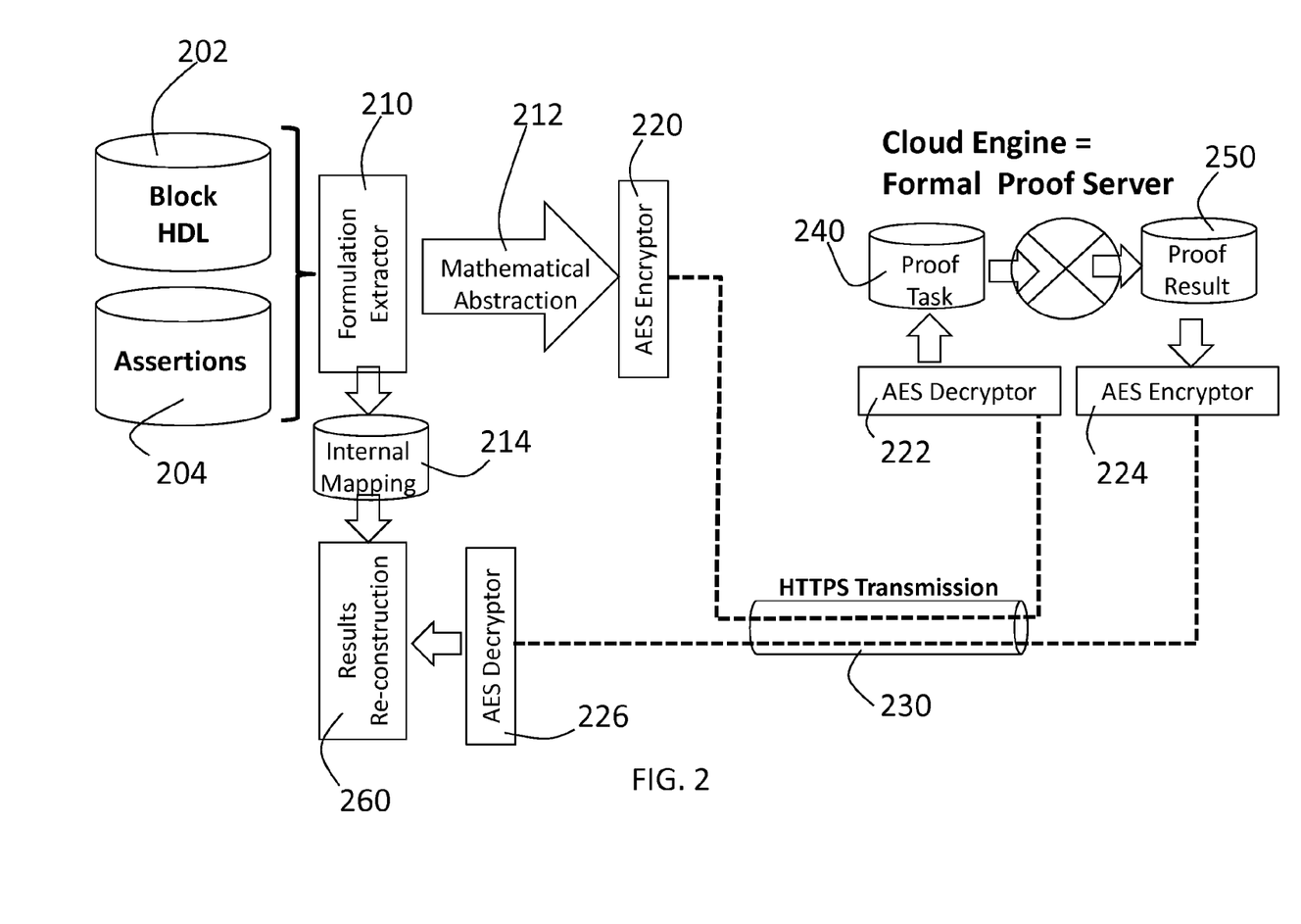
FIG. 2 is a flow diagram showing a method in accordance with a preferred embodiment of the present invention.

FIG. 2 shows the method of a preferred embodiment in greater detail. At the client tool 110, a reformulation of a specification of a circuit design's high-level functionality, expressed for example at the register-transfer level (RTL) using a hardware description language (HDL) 202, results in a proof task or proof problem for the verification of the design of the digital circuit 212. With the circuit design's HDL description, the client tool uses a set of the formal assertions or formal properties 204 describing the behaviour of functions of the digital circuit to extract the reformulation 210 of the design of the digital circuit, representing the proof task for verification of the design of the digital circuit. In this manner, names, details and any data that would allow re-engineering of the design are stripped out such that a design cannot be re-engineered from the reformulation.

The extraction of the reformulation representing the proof task for the verification of the design of the digital circuit may be performed in the following exemplary manner. First, a Finite State Machine (FSM) representation or description of a digital circuit is derived from an HDL source code via elaboration and synthesis. To do this, a parse tree consisting of HDL expressions and other information is created by a parser. The elaboration step will analyze the parse tree and translate it into a hierarchical FSM representation comprising Multi Valued Bit Vector Functions (MvHlFunc), represented by expressions. The compilation step computes a flattened (non-hierarchical) FSM on the same function level.

In a second step, the process described above is done for a property or some properties (e.g. from SVA, PSL), resulting in a FSM for each property on MvHlFunc level.

Next, the property FSMs and FSM representation of the design of the digital circuit are combined, whereupon the combined Finite State Machine representation of the circuit design to be verified is transformed from MvHlFunc to Bit Vector Functions (HlFunc) level. The reformulation is extracted from the HlFunc description and a mapping table is stored.

In each of the steps, Pruning is applied, which may comprise all or some of the following techniques: Constant Propagation, Term-Rewriting, Expression Sharing, combinational logic cone reduction, transitive logic cone reduction, and redundancy removal. In each step, transforming one level into the other (HDL→MvHlFunc, MvHlFunc→HlFunc, HlFunc→Reformulation) a problem specific mapping table is created to allow transformation of results, back to the level before.

The reformulation of the design of the digital circuit may be transmitted to the prover. This reformulation is then further transformed and mapped to gate level (boolean level), and even further from gate level to, e.g. CNF, applying the same principle as above.

A result of verifying the circuit design by proving the reformulation of the design of the digital circuit may be, for example, either "Holds" (reformulation is always true), "Fails" (there is a counter-example) or "Open" (unable to compute). In case of "Fails", a counter-example is a time course of values assigned to variables of the reformulation. The values are transmitted back from the cloud engine. Using the mapping tables 214, the counter-example values are transformed back level by level and displayed as values on HDL.

The client tool additionally performs internal mapping 214 for use in reconstruction results of a proof for the verification of the design of the digital circuit. The reformulation or proof task for the verification of the design of the digital circuit 212 is then encrypted, for example, by an encryptor 220 and transmitted through HTTPS tunnel 230. Prior to transmissions, the reformulation for the verification of the design of the digital circuit 212 may be compressed to reduce traffic in the network.

The encrypted reformulation for the verification of the design of the digital circuit is received at the cloud-based engine 130, which may be at a remote server. The encrypted reformulation 212 is decrypted at decryptor 222 to retrieve the proof task 240 for the verification of the design of the digital circuit. The proof task 240 is then processed by the formal proof server to produce a proof result 250, i.e. an outcome of the verification of the design of the digital circuit. The proof result 250 is then encrypted by an encryptor 224 and transmitted back through the HTTPS tunnel to the client tool 110 where it is decrypted by decryptor 226. The client tool then reconstructs a proof result 260 using the proof results 250 and the internal mapping 214.

Figure 3:
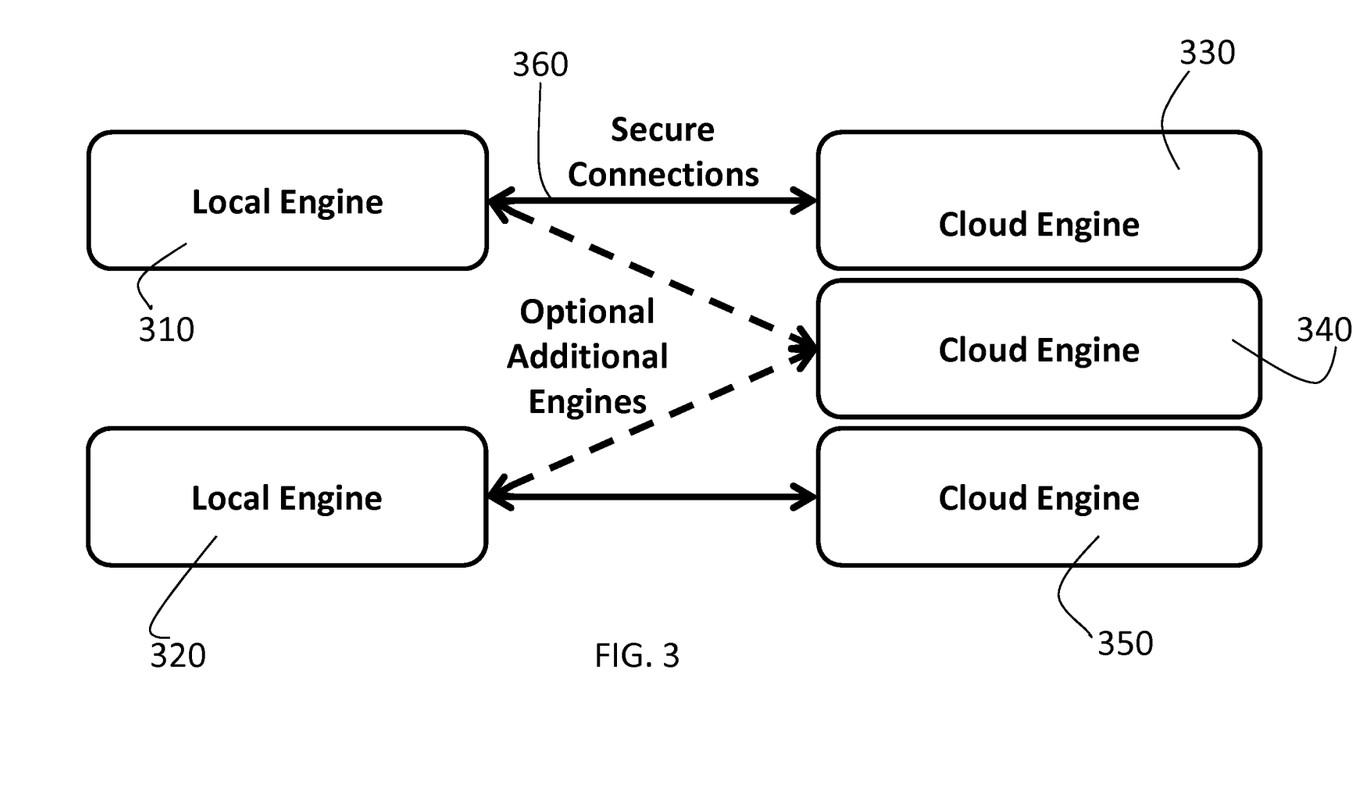
FIG. 3 is a block diagram showing expandability of a system and method in accordance with a preferred embodiment of the present invention.
Figure 4:
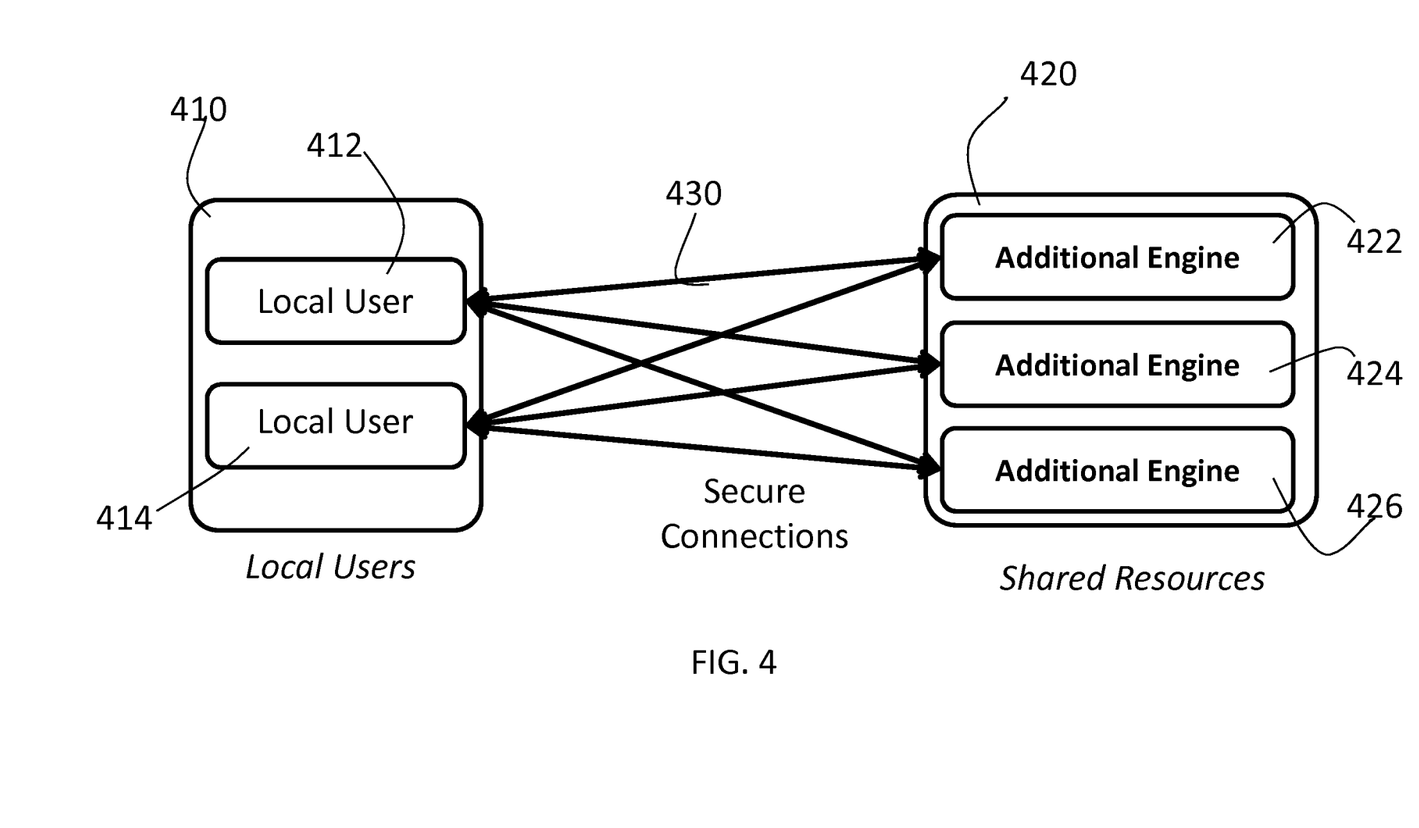
FIG. 4 is a block diagram illustrating a system and method for multiple users and shared resources in accordance with a preferred embodiment of the present invention.

FIGS. 3-4 illustrate the flexibility and scalability of the system and method of the present invention. The local system or network may have a plurality of local client tools 310, 320 and the cloud may have multiple verification engines 330, 340, 350 that communicate via secure connections 360. This allows a plurality of users 412, 414 on a local network 410 to use shared resources 420 that include a plurality of verification engines 422, 424, 426. The users and shared resources are connected via secure connections 430. This allows a user to run proofs on multiple engines simultaneously or multiple users to run proofs on one engine thereby allow flexibility and scalability.

Figure 5:
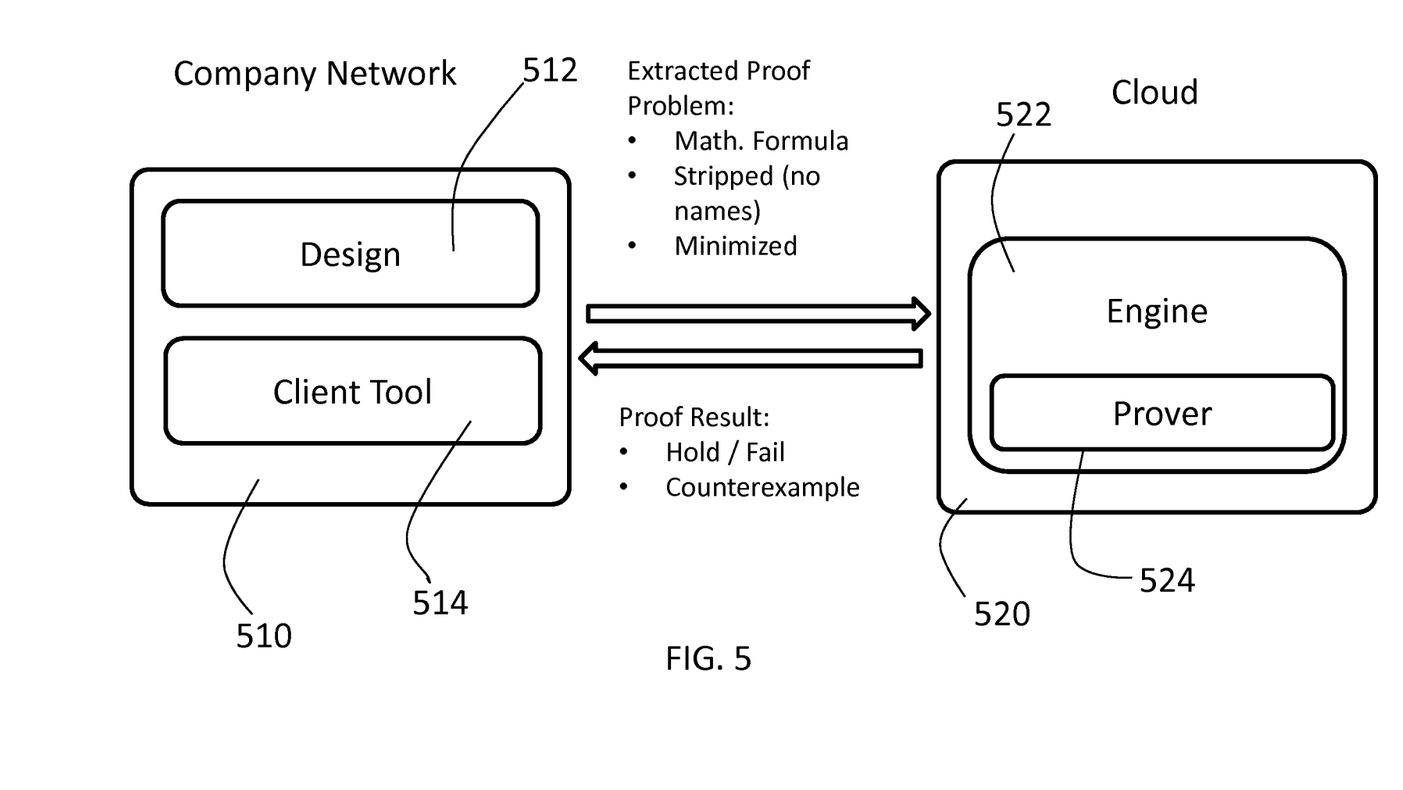
FIG. 5 is a flow diagram showing a system and method in accordance with a preferred embodiment of the present invention.

The method of the present invention may be referred to as a "split application." Such a "split application" uses both local network resources and cloud-based resources as shown in FIG. 5. The local network 510, for example, may store circuit design data 512 and run a verification setup and debugging tool 514. The cloud 520, for example, may run a verification engine 522 including a prover 524. Only an extracted proof problem for the verification of the design of the digital circuit, i.e., a reformulation that has been stripped and minimized, is transmitted from the local network 512 to the cloud 522. The proof result, for example, hold/fail or counterexample, is transmitted from the cloud 520 to the local network 510. In this manner, only a reformulation or proof problem for the verification of the design of the digital circuit, e.g., (v1 && v2)==0|=>v3, is transmitted from the local client to the cloud. The reformulation is reduced to proof relevant data, which may be referred to as the "cone of the assertion" or "cone of influence" No re-engineerable data, such as source code, code structure, signal names or explicit clocking, is transmitted to the cloud 520 or stored in the cloud 520.

Figure 6:
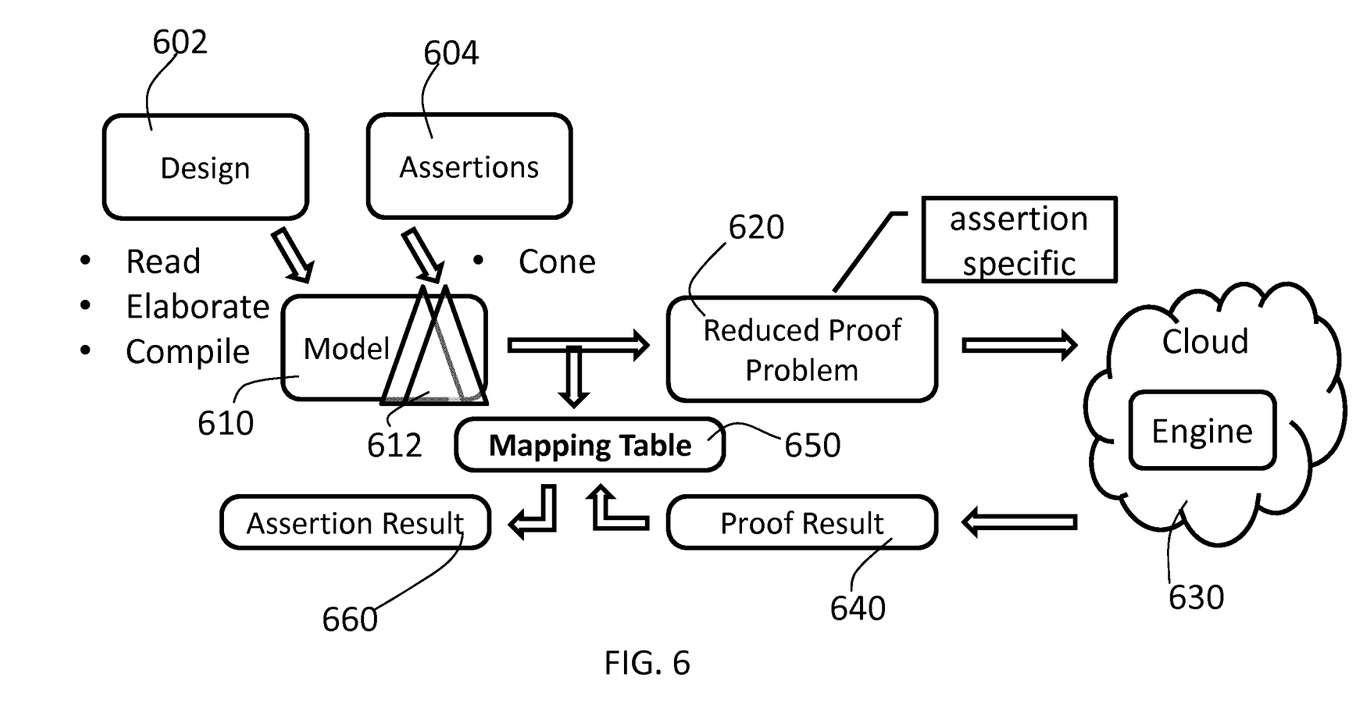
FIG. 6 is a flow diagram showing a method in accordance with a preferred embodiment of the present invention.

The operation of the local side of the split application is shown in FIG. 6. The design (source code) and assertion data 602, 604 are transformed into a model 610. The proof problem 620 for the verification of the design of the digital circuit is carved out of the model by taking only the part of the model that is needed to prove the assertions (cone of the assertions or cone of influence 612). During the process, a mapping table 650 is created to interpret results later. The mapping never leaves the local machine. The reduced proof problem 650 is assertion specific and is transmitted to the cloud engine 630. The cloud engine 630 returns a proof result 640 to the local network. The proof result 640 and mapping table 650 are used to reconstruct an assertion result 660 which may be displayed to a user on a display.

As an illustrative example, consider design 602 of a digital circuit named test1, in the form of a source code expressed in the Verilog language. The digital circuit has as inputs the variables clk representing the clock of the digital circuit, rst representing the reset of the digital circuit, as well as the signals i1 and i2. The digital circuit has as output the variable o. The digital circuit comprises the logic gates or elements s1, s2, s3, s4. The Verilog source code reads as follows:

```
module test1 (input clk, rst, i1, i2, output logic o);
    logic s1; // used directly in assertions
    logic s2; // used indirectly in assertions
    logic s3; // used directly in assertions
    logic s4; // unused in assertions
    always @(posedge clk or posedge rst)
        if(rst)
            begin
                s1 <= 0;
                s2 <= 0;
                s3 <= 0;
                s4 <= 0;
                o <= 0;
            end
        else
            begin
                s1 <= i1;
                s2 <= i2;
                s4 <= i1 || i2;
                s3 <= s2;
                o <= s1 || s2 || s3 || s4;
            end
    testme: assert property (@(posedge clk)
            disable iff (rst) ##1 (s1 == $past(i1)));
    testme2: assert property (@(posedge clk)
            disable iff (rst) ##2 (s3 == $past(i2, 2)));
    testme3: assert property (@(posedge clk)
            disable iff (rst) ##2 (s3 == $past(i2, 1)));
endmodule
```

The digital circuit test1 comprises assertions 604 testme, testme2, and testme3, which describe a behavior of the design. In this illustrative example, there is no need for combining the Finite State Machine representation of the design of the digital circuit with a Finite State Machine representation of the assertions.

From the source code describing the digital circuit, a Finite State Machine representation of the design of the digital circuit is extracted. Stripping timing aspects of the Finite State Machine representation yields a so-called 0-delay model of the design of the digital circuit Transforming 0-delay model into a single static assignment form gives

```
s1'next = if (rst == 1) then 0
          else if(posedge clk) i1 else s1
s2'next = if (rst == 1) then 0
          else if(posedge clk) i2 else s2
s3'next = if (rst == 1) then 0
          else if(posedge clk) s2 else s3
s4'next = if (rst == 1) then 0
          else if(posedge clk) i1 || i2 else s3
o'next = if (rst == 1) then 0
         else if(posedge clk) s1 || s2 || s3 || s4 else
         o
```

Each of the assertions 604 is translated into a Finite State Machine representation on the MvHlFunc level.

When reducing the proof problem 620 to the data relevant to the proof, as a first step, all signals that are not inputs or states are removed from the proof problem for the verification of the digital circuit. In other words, the variables in the 0-delay model of the design of the digital circuit, which do not relate to the signals or states of the digital circuit, are removed from the said representation.

In a second step, the cone of influence 612 of the proof problem for the verification of the digital circuit is computed. The cone of influence 612 forms a set of signals that need to be kept. This set must be extended in a recursive procedure by the cone of influence 612 of all states in the set of signals. This recursion ends when no additional states are found. The 0-delay model of the design of the digital circuit can then be reduced to the set of signals found at the end of the recursion, as no other signals are relevant for the proof problem for the verification of the digital circuit. The so reduced 0-delay model of the design of the digital circuit is called the reduced Finite State Machine representation of the design of the digital circuit.

For the above digital circuit test1 the cone of influence 612 computes as follows.

The cone of influence of the assertion testme directly gives s1, i1, clk and rst. This set of signals comprises the state s1 and must therefore be complemented by the cone of influence 612 of the stats s1. However, as the cone of influence 612 of the state s1 is clk, rst and i1, the cone of influence of the assertion testme remains unchanged.

Likewise, the cone of influence 612 of the assertion to gives s3, i2, clk and rst, comprising the signal s3. The cone of influence 612 of the signal s3 is clk, rst and s2, comprising the signal s2. The cone of influence 612 of the signal s2 is clk, rst and i2. Therefore, no further signals are added to the cone of influence of the assertion testme2.

Likewise, the cone of influence 612 of the assertion to gives s3, i2, clk and rst, comprising the signal s3. The cone of influence 612 of the signal s3 is clk, rst and s2, comprising the signal s2. The cone of influence 612 of the signal s2 is clk, rst and i2. Therefore, no further signals are added to the cone of influence of the assertion testme3.

In a following step, the Finite State Machine representation of the design of the digital circuit is anonymized. This is achieved by assigning a numbered variable to each signal in the reduced Finite State Machine representation of the design of the digital circuit and storing the assignments in a translation or mapping table 650 for later reconstruction of a counterexample.

For the above digital circuit test1, the translation or mapping table 650 for anonymizing the reduced Finite State Machine representation of the design of the digital circuit reads as follows:

clk→v1
rst→v2
i1→v3
i2→v4
s1→v5
s2→v6
s3→v7
s4→v8
o→v9

This translation or mapping table 650 enables anonymizing the reduced Finite State Machine representation of the design of the digital circuit by using the numbered variables v1, . . . , v9. Storing of the translation or mapping table 650 will also allow assigning the original names to a proof result formulated in terms of the numbered variables v1, . . . , v9.

The reduced Finite State Machine representation of the design of the digital circuit or reduced proof problem 620, anonymized using the above translation or mapping table 650, is transmitted to the remote server or the cloud 630. In case of the above digital circuit test1, the following anonymized and reduced proof data for the verification of the design of the digital circuit would be transmitted to the remote server or the cloud 630:

testme:
    states: v5
    inputs: v1, v2, v3
    state-relation:
    v5'next=if (v2==1) then 0 else if (posedge v1) v3 else v5
    assertion: @posedge (v1) disable iff v2 (v5==$past (v3, 1))
wherein the numbered variables correspond to states or signals of the digital circuit as indicated in the above mapping table 650.

testme2:
    states: v6, v7
    inputs: v1, v2, v4
    state-relation:
    v6'next=if (v2==1) then 0 else if (posedge v1) v4 else v6
    v7'next=if (v2==1) then 0 else if (posedge v1) v6 else v7
    assertion: @posedge (v1) disable iff v2 (v7==$past (v4, 2))
wherein the numbered variables correspond to states or signals of the digital circuit as indicated in the above mapping table 650.

testme3:
    states: v6, v7
    inputs: v1, v2, v4
    state-relation:
    v6'next=if (v2==1) then 0 else if (posedge v1) v4 else v6
    v7'next=if (v2==1) then 0 else if (posedge v1) v6 else v7
    assertion: @posedge (v1) disable iff v2 (v7==$past (v4, 1))
wherein the numbered variables correspond to states or signals of the digital circuit as indicated in the above mapping table 650.

At the remote server or the cloud 630, a proof for the verification of the design of the digital circuit is run on the reduced proof problem 620, the result of which is transmitted back to the local engine 310, 320. The result can be one of 'hold', 'unresolved' (within the limits of the computing resources), or 'fail'. In the first two cases, simply the message 'hold' and 'unresolved' is transmitted, respectively.

In the third case, when the proof has failed, the time courses of the anonymized signals is transmitted to the local system or engine 310, 320. Such a time course can, in the case of the above digital circuit test1, be

| | | | | |
|---|---|---|---|---|
| v2@0 = 1, | v2@1 = 0, | v2@2 = 1, | v2@3 = 0, | v2@4 = 1, |
| v2@5 = 0, | v2@6 = 1, | v2@7 = 0, | v2@8 = 1, | v2@9 = 0, |
| v2@10 = 1, | v2@11 = 0, | v2@12 = 1, | v2@13 = 0, | v2@14 = 1, |
| v2@15 = 0, | v2@16 = 1, | v2@18 = 0, | v2@19 = 1, | v2@20 = 0, |
| v2@21 = 1, | v2@22 = 0, | v2@23 = 1, | v1@0 = 1, | v1@1 = 1, |
| v1@2 = 0, | v1@3 = 0, | v1@4 = 0, | v1@5 = 0, | v1@6 = 0, |
| v1@7 = 0, | v1@8 = 0, | v1@9 = 0, | v1@10 = 0, | v1@11 = 0, |
| v1@12 = 0, | v1@13 = 0, | v1@14 = 0, | v1@15 = 0, | v1@16 = 0, |
| v1@17 = 0, | v1@18 = 0, | v1@19 = 0, | v1@20 = 0, | v1@21 = 0, |
| v1@22 = 0, | v1@23 = 0, | v4@0 = 0, | v4@1 = 0, | v4@2 = 0, |
| v4@3 = 0, | v4@4 = 0, | v4@5 = 0, | v4@6 = 0, | v4@7 = 0, |
| v4@8 = 0, | v4@9 = 0, | v4@10 = 0, | v4@11 = 0, | v4@12 = 0, |
| v4@13 = 0, | v4@14 = 0, | v4@15 = 0, | v4@16 = 1, | v4@17 = 1, |
| v4@18 = 1, | v4@19 = 1, | v4@20 = 0, | v4@21 = 0, | v4@22 = 0, |
| v4@23 = 0. | | | | |

For reconstructing the verification result, this result is de-anonymized using the above translation or mapping table 650. Signals present in the cone of influence 612, but not in the time course returned by the remote server or cloud 630, are then set to arbitrary values. Signals that were removed during the reducing of the proof problem are then set to arbitrary values. All other signals are subsequently reconstructed from the inputs and the states. Thereby, the digital circuit under design may be reconstructed, which may be done on-demand.

Figure 7:
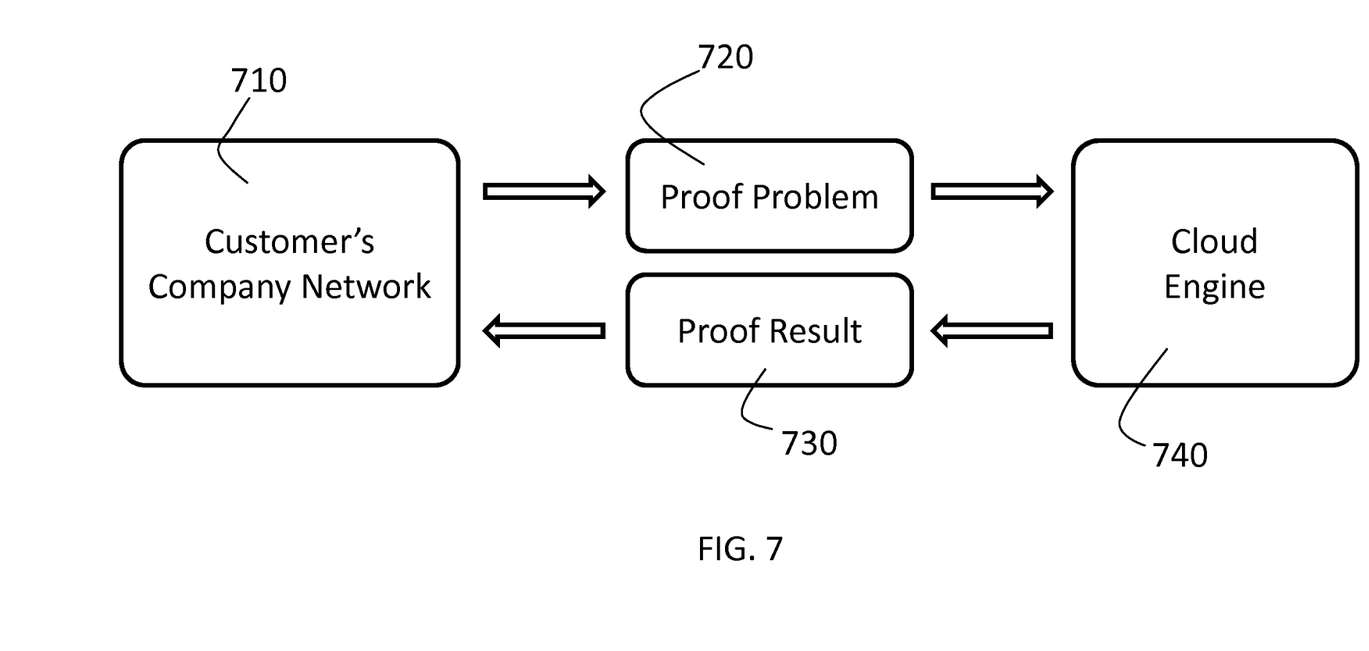
FIG. 7 is a flow diagram showing a method in accordance with a preferred embodiment of the present invention.

The operation of the cloud-side of the system is shown in FIG. 7. The customer or client network 710 transmitted the reduced proof problem 720 to the cloud-based system. The cloud-based system receives the proof problem or task and stores it in memory. No data is stored on a hard drive or any other non-volatile memory. The cloud-based system then runs a prover 740 to solve the proof problem or task. The proof result 730 is then transmitted back to the customer or client network 710.

Figure 8:
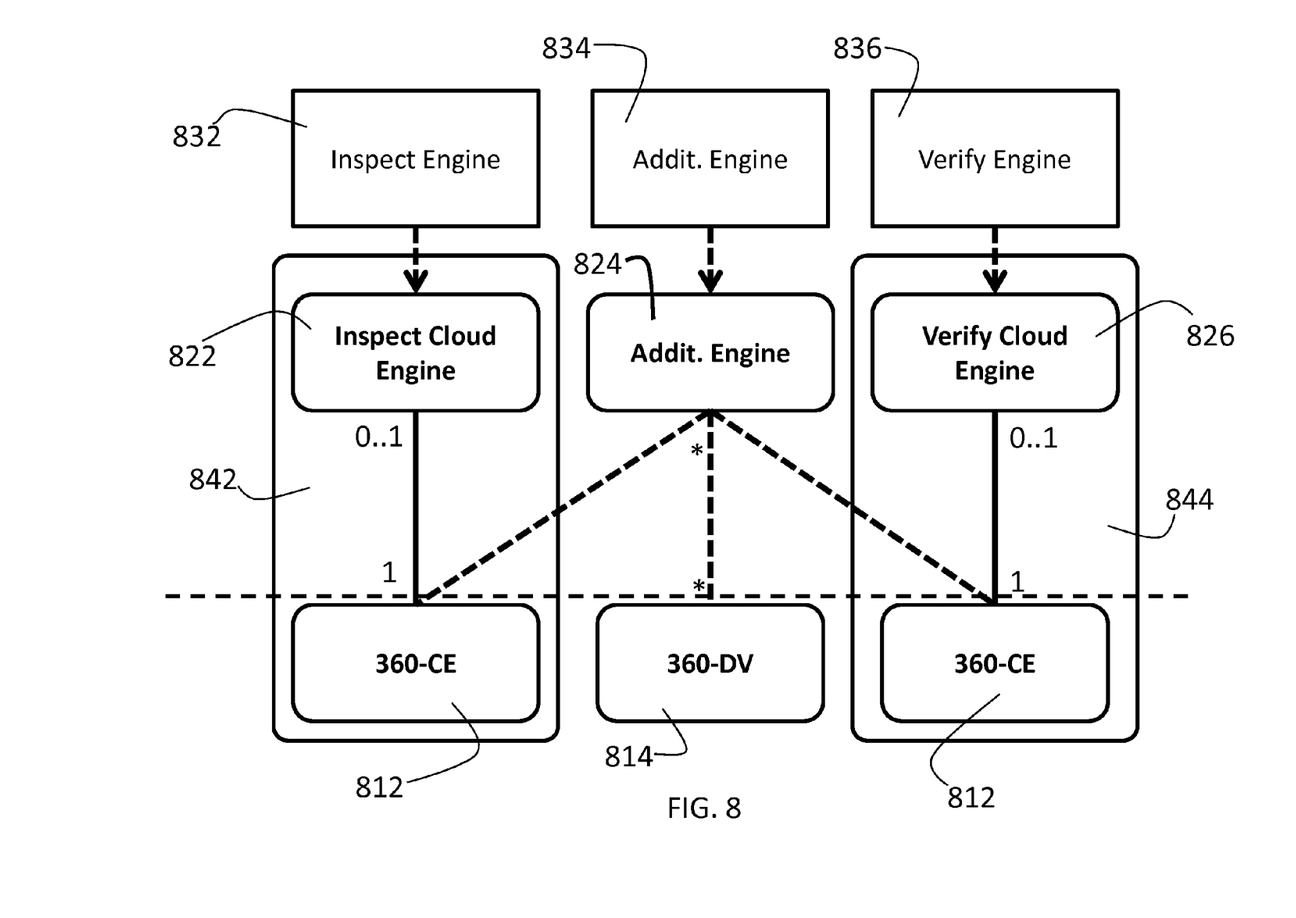
FIG. 8 is a block diagram showing expandability of a system and method in accordance with a preferred embodiment of the present invention.

The scalability of the present invention is further shown in FIG. 8.

FIG. 8 illustrates an embodiment in which the present invention is deployed and how it scales for multiple applications. There are different local tools, e.g. 360-CE (812) and 360-DV (814). 360 DV (814) is a full blown formal tool. It can be extended with one or more formal proof engines (824). 360-CE (812) is a limited tool that does not need the cloud to run (but could also be done that way). However, it can be extended to include more features, solving more advanced verification problems, and thus create different proof problems by attaching different cloud engines, e.g. Inspect (822), or Verify (826). After attaching an Inspect engine (822) to 360-CE (812), the combination of both forms an application Inspect (842) that is split between local tool and cloud engine. Additional proof engines (824) can also be added to improve performance by parallel computation. Attaching a verify cloud engine (826) to 360-CE (812) forms an application Verify (844). The binary versions (programs) (832, 834, 836) of the cloud engines (824, 822, 826) are stored in the cloud and are started by the user on some cloud computer on demand. (Note: The number symbols 1, 0..1, * have the meaning as in entity relationship diagrams, i.e. 1=exactly one, 0..1=none or exactly one. *=any number including 0.)

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A method for formal verification of a digital circuit comprising:
    extracting a proof problem from data representing a register-transfer level functionality of the digital circuit with a local processor by removing timing aspects from data representing the register-transfer level functionality of the digital circuit;
    reducing said proof problem to proof relevant data by removing all signals that are not inputs or states of the digital circuit;
    anonymizing with a translation table and encrypting said reduced proof problem;
    transmitting said anonymized and encrypted reduced proof problem to a remote server;
    decrypting said anonymized and encrypted reduced proof problem at said remote server;
    storing said anonymized reduced proof problem in a memory at said remote server;
    running a proof for verification of the design of the digital circuit on said anonymized reduced proof problem at said remote server to generate an anonymized proof result;
    encrypting said anonymized proof result at said remote server;
    transmitting said anonymized and encrypted proof result to said local processor;
    de-anonymizing and decrypting said anonymized and encrypted proof result at said local processor; and
    reconstructing a verification result of said digital circuit design at said local processor using the inputs and the states from said de-anonymized and decrypted proof result.

2. A method for formal verification of a digital circuit according to claim 1, wherein said extracted proof problem comprises a reformulation of the HDL representation of the design of the digital circuit.

3. A method for formal verification of a digital circuit according to claim 1, further comprising compressing said encrypted reduced proof problem prior to transmitting it to said remote server.

4. A method for formal verification of a digital circuit according to claim 1, further comprising compressing said encrypted reduced proof result prior to transmitting it to said local processor.

5. A method for formal verification of a digital circuit comprising:
    extracting a proof problem from data representing a register-transfer level functionality of the digital circuit with a local processor by removing timing aspects from the data representing the register-transfer level functionality of the digital circuit;
    reducing said proof problem to proof relevant data by removing all signals that are not inputs or states of the digital circuit;
    encrypting said reduced proof problem;
    transmitting said encrypted reduced proof problem to a remote server;
    storing said reduced proof problem in a memory at said remote server;
    running a proof for verification of the design of the digital circuit on said reduced proof problem at said remote server to generate a proof result;
    transmitting said encrypted proof result to said local processor;
    decrypting said encrypted proof result at said local processor; and
    reconstructing a verification result of said digital circuit design at said local processor using the inputs and states from said decrypted proof result.

6. A method for formal verification of a digital circuit according to claim 5, wherein said extracted proof problem comprises a reformulation of the HDL representation of the design of the digital circuit.

7. A method for formal verification of a digital circuit according to claim 5, further comprising compressing said encrypted reduced proof problem prior to transmitting it to said remote server.

8. A method for formal verification of a digital circuit according to claim 5, further comprising compressing said encrypted reduced proof result prior to transmitting it to said local processor.

* * * * *